United States Patent Office 3,411,839
Patented Nov. 19, 1968

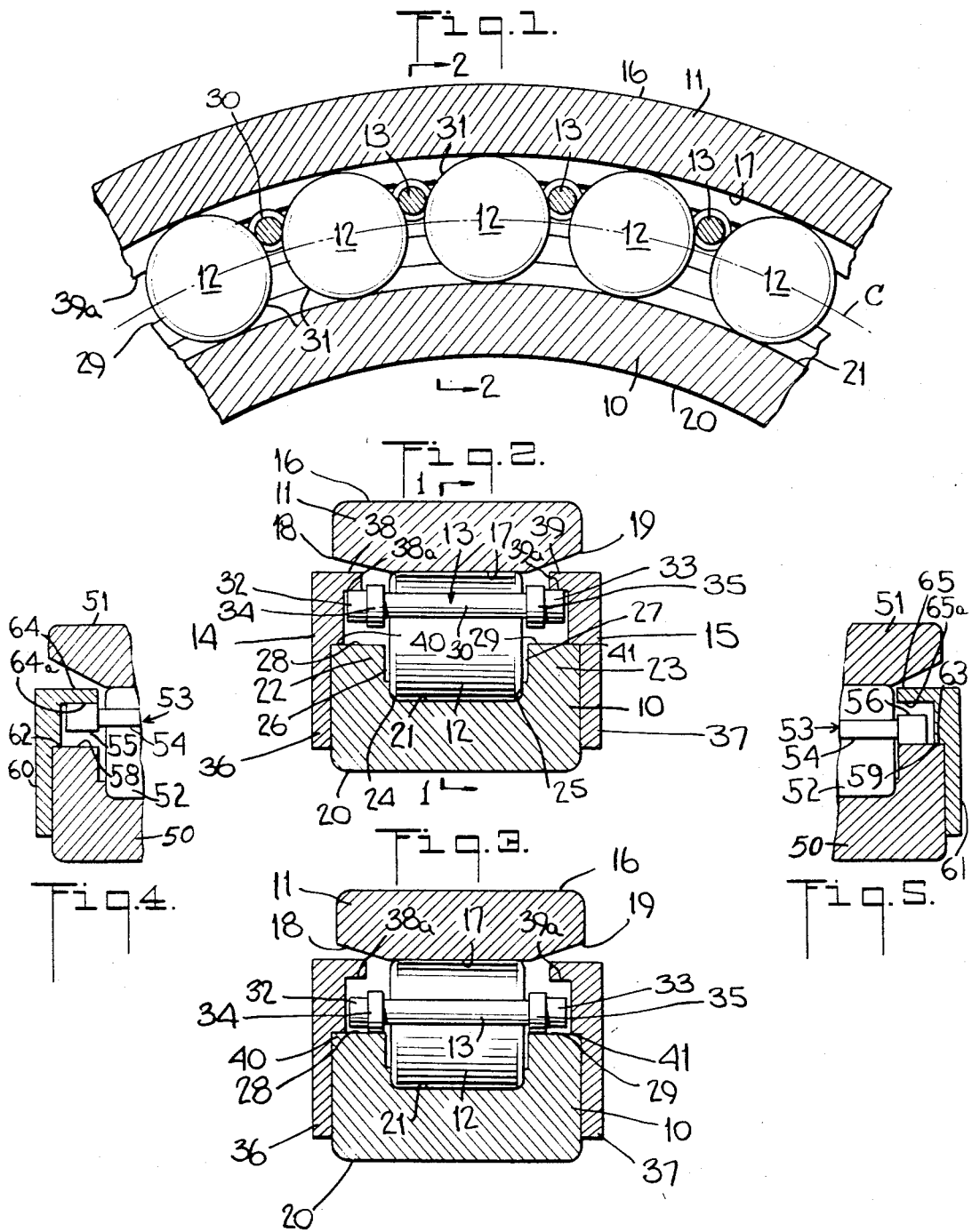

3,411,839
QUILL TYPE ROLLER BEARING
Donald P. Johnston, Jamestown, N.Y., assignor to TRW Inc., Euclid, Ohio, a corporation of Ohio
Filed May 10, 1966, Ser. No. 549,003
4 Claims. (Cl. 308—206)

ABSTRACT OF THE DISCLOSURE

A roller bearing comprises inner and outer rings with rollers therebetween spaced by cylindrical rolling quills riding on races in side plates mounted on the inner rings. The circumferential axially extending surfaces are on opposite sides of the inner race having a diameter greater than the inner race and supporting the side plates to attain the desired dimensional relationship for the pure rolling relationship of engaging surfaces.

---

This invention relates to roller bearings and is directed particularly to roller bearings having quills and side plates for spacing the rollers.

Various types of means are utilized in roller bearings for spacing the rollers. The cage type of spacer or separator has the objection of producing a rubbing contact between the cage and the roller which creates wear and friction. It has long been recognized that the ideal spacers are small rollers or quills. The rolling contact between the spacing quills and rollers greatly reduces wear and eliminates it from the roller surfaces engaging the races. However, several difficulties have been encountered in attaining the proper relation to insure rolling contact of the parts. In the manufacture of the parts it is difficult to secure the proper sizes and tolerances for proper concentricity and dimensional tolerances.

It is, therefore, desirable to provide a bearing in which the dynamically contacting surfaces are machined to precise dimensions within narrow tolerance limits to insure rolling contact without any sliding or skidding. This precise dimensioning is particularly desirable for interchangeability of parts and for avoiding the need of matching components in order to secure the necessary dimensional relationship for pure rolling contact.

Heretofore the precise dimensioning of components required the matching of the components in order to secure the rolling contact. This is expensive and time consuming. Rolling contact has also been attempted by oversizing or offsizing parts of the bearing and running the bearing to wear the surfaces into the desired relationship. This is objectionable in that it is expensive and causes undue wear of other parts.

An object of the invention is to provide a quill type of roller bearing with the surfaces arranged for precise relative machining for producing pure rolling contact between the parts.

Another object of the invention to provide a quill type of roller bearings with the parts having low dimensional tolerances for selection of any parts to form a bearing.

Another object of the invention is to provide a quill type of roller bearing in which the quills are maintained in proper relation to the rollers for preventing jamming of the quills between the rollers.

Other and further objects and advantages will be apparent from the following description taken in connection with the drawings in which FIG. 1 is a fragmentary side view of the roller bearing taken along lines 1—1 of FIG. 2;

FIGS. 2 and 3 are sectional views taken along lines 2—2 of FIG. 1; and

FIGS. 4 and 5 are fragmentary sectional views taken along a section corresponding to lines 2—2 of FIG. 1 of a bearing having quills without rims.

Referring to FIGS. 1 and 2, the roller bearing comprises an inner ring 10 and an outer ring 11 with cylindrical rollers 12 positioned therebetween. The rollers are spaced by quills 13 which are held on relative rotation of the rings by the side plates 14 and 15.

The outer ring 11 is of a conventional type having an outer surface 16 and an inwardly facing race 17 engaged by the rollers 12. Surfaces 18 and 19 are at an angle to the axis of the bearing to accommodate the side plates 14 and 15 and permit the flow of lubricant.

The ring 10 has a cylindrical mounting bore 20 and an outwardly facing race 21 for engagement by the rollers 12. The ring 10 has radially extending sides 22, 23 on opposite sides of the race 21 and rollers 12. Adjacent to the race 21 are surfaces 24 and 25 facing the ends of the rollers for guiding the rollers axially. The radially extending sides 22 and 23 have circumferentially extending spaces 26 and 27 to permit the flow of lubricant between the inner ring and the rollers. The sides 22 and 23 extend outwardly radially to position the outwardly facing surfaces 28 and 29 at a point described later herein.

The quills 13 are positioned between the rollers, as illustrated, and comprise main cylindrical surfaces 30 engaging the cylindrical surfaces 31 on the rollers 12. At the outer ends of the quills are cylindrical end surfaces, 32, 33 with rims 34, 35 positioned between the cylindrical end surfaces and the main cylindrical surfaces. Side plates 36 and 37 are mounted on the inner ring 10 and annular flanges 38 and 39 with race surfaces 38a, 39a, respectively, engaged by the quills 13 to position the main cylindrical surfaces and end surfaces in rolling contact with the rollers and side plates.

In the forming of the inner ring 10 the final machining of the surfaces of the ring is performed by finishing the outside diameter surfaces 28 and 29 to a given dimension. These surfaces function as the reference surfaces for the grinding of the cylindrical bore 20 and the cylindrical inner race 21.

The distance of the side plate race surfaces 38a and 39a is also critical in its relationship to the race 21. The critical positioning is attained by the precise machining of the locating diameters of the cylinder bore surfaces 40 and 41 on the side plates within narrow tolerances. These bore surfaces fit on the cylindrical surfaces 28 and 29, respectively, and thus function to precisely position the side plate race surfaces 38a, 39a in relation to the outer diameter surfaces 28 and 29. The surfaces 38a and 39a are machined in relation to the precisely dimensioned surfaces 40 and 41, and the race 21 is machined in relation to the surfaces 28 and 29. In each instance there is a single measurement to the reference surfaces 28, 29, thus greatly reducing variation. This permits a more precise and consistent relation to be maintained between the side plate races 38a and 39a and the inner ring race 21. The inner roller engaging surfaces 30 and the end surfaces 32, 33 are precisely machined to given diameters and for concentricity.

The quills also have a given dimensional relation to the radiuses of the side plate race surfaces 38a and 39a and the radius of the race 21. The radius of the end surface and the radius of the inner surface of the quill are proportional to the radius of the inwardly facing cylindrical race surfaces 38a, 39a and the radius of the inner ring race. When the dimensions conform to this relation the end surfaces of the quill are in rolling contact with the side plate race surfaces and the inner surface of the quill is in rolling contact with the rollers 12. The rims 34, 35 on sidewise shifting of the quills or skewing of the quills engage either the sides of the rollers 12 or the inwardly facing surfaces 38b and 39b on the flanges 38 and 39.

In either case the contacting surfaces are engaged by the radial surfaces of the rims where the rubbing action can do little damage.

When the bearing is not operating, the quills 13 drop inwardly. It is desirable to keep the quills above the pitch circle C passing through the axis of the rollers so that the quill is always on the upper side of the roller surface. This prevents jamming of the quills. The surfaces 22, 23 extend outwardly so that when the rims 34 and 35 engage the surfaces 28 and 29, the quills are held above the center of the rollers (FIG. 3).

The important criterion in the bearing is to provide a precise relation between the race of the inner ring and the bearing surfaces of the side plates, both as to radial dimension and to concentricity of the surfaces to one another. In the standard roller bearings, it is only necessary to have the inner race and the bore of the inner ring concentric to one another. However, in the quill type of roller bearings the outwardly facing side surfaces of the inner ring must be precisely positioned in relation to the bore and race of the inner ring and the cylindrical surface of the side plate fitting on the outwardly facing side surfaces must be precisely related to the bearing surfaces of the side plates in order to provide the proper dimensional relations and the desired concentricity of these surfaces to one another. By utilizing the outwardly facing side surfaces of the inner ring as a reference surface, all dimensions on the inner ring can be taken from this one reference surface. Thus the inner bore and the inner race will be concentric to these outer reference surfaces. This relationship has the advantage that the outwardly facing surfaces of the inner ring have the greatest diameters of the ring and are easily ground to a given dimension. As a result, tolerances are more easily controlled and better concentricity provided. Also, as between successive rings a more uniform reference surface for the grinding of the inner race and bores is provided. This eliminates the matching of parts to form a bearing. On the side plate the bearing surface and the fitting surface are both ground in the same direction, and there are no intermediate projections or ridges to present grinding difficulties. Thus standard grinding techniques for forming inwardly facing surfaces may be used in manufacturing the side plates and the two surfaces can be ground simultaneously by the same machine, resulting in smaller dimensional tolerances.

Since the outwardly facing side surfaces on the inner rings is the largest diameter on the ring, the surfaces may be ground to close tolerances. As to the side plates, it means that the contacting surface of the side plates can be ground precisely and interchangeability occurs between the side plates, and thus avoids the necessity of matching side plates to a given inner ring. This, of course, also improves the concentricity relationship between the side plates and the surfaces of the inner ring.

The rims on the quills reduce the distance between the surfaces engaging the side plates to maintain the alignment of the quills and to prevent skewing. The rims can either engage the sides of rollers or the surfaces 38b and 39b. The larger radially extending surfaces of the rims provide a large area for distributing wear and abrasion. This is particularly desirable if the flanges engage the side surfaces of the load carrying rollers. Further, these larger surfaces provide closer axial control of the position of the quill and the tendency to skew is corrected by many small adjustments instead of one large and sometimes violent correction that occurs with the dumbbell design. The rims in addition maintain the quills outside of the pitch circle through the centers of the rollers, thus permitting the space between the rollers to circumferentially open without the quills dropping and jamming between the rollers and the inner race.

The larger diameter of the reference surfaces 28, 29 locates them closer to the race surfaces 38a, 39a of the side plates, increasing the manufacturing accuracies. This along with the direct reference of the race surfaces 38a, 39a to the bores 40, 41 matches the race surfaces accurately so that the velocity of the ends of the quills engaging one side plate is identical to the velocity of the ends of the quills engaging the other side plate, thereby reducing the tendency of the quills to skew.

In FIGS. 4 and 5 another embodiment of the bearing is illustrated in which the quills 53 comprise a main cylindrical surface 54 and larger cylindrical end surfaces 55 and 65 without the rims 34 and 35 of the embodiments of FIGS. 1 to 3. The diameter of the cylindrical portions 54, 55, 56 correspond to those of the embodiments of FIGS. 1 to 3. The rollers 52 and the outer ring 51 are the same as the rollers 12 and outer ring 11 of the other embodiment. The inner ring 50 is similar to the inner ring 10 except that the outwardly facing surfaces 58 and 59 are at a greater radius than the outer surfaces 28 and 29, so that the cylindrical end surfaces 55 and 56 engage the surfaces 58 and 59 to support the quill and the main cylindrical surface 54 is therefore above the center line of the rollers 52. The side plates 60 and 61 have the flanges 64 and 65 extending inward so that the races 64a and 65a engage the entire surface of the cylindrical surfaces 55 and 56. The races 64a and 65a have the same radius as the races 38a and 39a. The surfaces 62 and 63 engaging the surfaces 58 and 59 are of a corresponding larger radius than the surfaces 40 and 41. Otherwise the side plates 60 and 61 are similar to the side plates 14 and 15. In FIG. 4 the quills are illustrated in a dynamic state and in FIG. 5 they are illustrated in a static state and engaging the inner ring 50.

Various modifications and changes may be made in the foregoing embodiment without departing from the invention as set forth in the appended claims.

I claim:

1. A roller bearing comprising inner and outer rings having inner and outer races, said inner ring having outwardly facing surfaces on opposite sides of said inner race and having diameters greater than said inner race and forming the primary reference for grinding said inner race, load bearing rollers between said races and in dynamic contact therewith, roller spacing quills positioned between said rollers and radially outward of the pitch circle of said rollers, said quills having intermediate surfaces dynamically contacting said rollers and having end surfaces of greater diameter than said intermediate surfaces, side plates having inwardly facing races dynamically contacted by said end surfaces and having bore surfaces radially within said side plate races in precise dimensional relation thereto and having generally radially extending surfaces axially facing one another between said side plate races and said bore surfaces, characterized by said inwardly facing surfaces being spaced axially apart over their entire surface areas a greater distance than any axial distance between said side plate races and said bore surfaces having the same diameter as said outwardly facing reference surfaces and fitting thereon to directly relate said side plate races to said outwardly facing reference surfaces to precisely position said side plate races to said inner race so that dynamically contacted surfaces of the bearing are in pure rolling engagement on assemblage of said bearing.

2. A roller bearing comprising inner and outer rings having inner and outer races, said inner ring having outwardly facing surfaces on opposite sides of said inner race and having diameters greater than said inner race and forming the primary reference for grinding said inner race, load bearing cylindrical rollers between said races and in dynamic contact therewith, roller spacing quills positioned between said rollers and radially outward of the pitch circle of said rollers, said quills having intermediate cylindrical surfaces dynamically contacting said rollers and having end cylindrical surfaces of greater diameter than said intermediate cylindrical surfaces, side plates having inwardly facing cylindrical races dynamically contacted by said end surfaces and having bore surfaces radially within said side plate races in precise dimensional relation thereto and having generally radially extending surfaces axially facing one another between said side plate races and said bore surfaces, characterized by said inwardly facing surfaces being spaced axially apart over their entire surface areas a greater distance than any axial distance between said side plate races and said bore surfaces having the same diameter as said outwardly facing reference cylindrical surfaces and fitting thereon to directly relate said side plate races to said outwardly facing reference surfaces to precisely position said side plate races to said inner race so that dynamically contacted surfaces of the bearing are in pure rolling engagement on assemblage of said bearing.

3. A roller bearing comprising an outer ring having an inwardly facing cylindrical race, an inner ring having an outwardly facing cylindrical race, cylindrical rollers between said inner and outer races and in dynamic contact therewith, said inner ring having outwardly facing cylindrical surfaces of greater diameter than said inner race and precisely dimensioned in relation thereto, quills positioned radially outward of the pitch circle of said rollers and therebetween, said quills having main cylindrical surfaces dynamically contacting said rollers and having end cylindrical surfaces of greater diameter than said main cylindrical surfaces, side plates having inwardly facing cylindrical races dynamically contacted by said end surfaces and having bore surfaces radially within said side plate races in precise dynamic relation thereto and having generally radially extending surfaces axially facing one another between said side plate races and said bore surfaces, characterized by said inwardly facing surfaces being spaced axially apart over their entire surface areas a greater distance than any axial distance between said side plate races and said bore surfaces having the same diameter as said outwardly facing cylindrical surfaces and fitting thereon to directly relate said side plate races to said outwardly facing surfaces to precisely position said side plate races to said inner race so that dynamically contacted surfaces of the bearing are in pure rolling engagement on assemblage of said bearing.

4. A roller bearing as set forth in claim 3 wherein said outwardly facing cylindrical surfaces and said end cylindrical surfaces are dimensioned to maintain the quills radially outward of the pitch circle.

References Cited

UNITED STATES PATENTS 2,120,533  6/1938  Tillson _____ 308—206

FOREIGN PATENTS 345,714  1/1920  Germany.
945,251  12/1963  Great Britain.

MARTIN P. SCHWADRON, *Primary Examiner.*

F. SUSKO, *Assistant Examiner.*